(12) United States Patent
Bouat

(10) Patent No.: US 7,830,894 B2
(45) Date of Patent: Nov. 9, 2010

(54) COMMUNICATIONS

(75) Inventor: Sebastien Bouat, Crolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1847 days.

(21) Appl. No.: 10/901,379

(22) Filed: Jul. 29, 2004

(65) Prior Publication Data

US 2005/0094625 A1 May 5, 2005

(30) Foreign Application Priority Data

Oct. 30, 2003 (EP) ................................ 03292713

(51) Int. Cl.
*H04L 12/28* (2006.01)
*H04L 12/56* (2006.01)

(52) U.S. Cl. ................... 370/401; 370/264; 370/338; 370/348; 370/352; 370/522

(58) Field of Classification Search ................ 370/338, 370/401, 522, 352, 356, 493, 466, 467, 264, 370/348
See application file for complete search history.

(56) References Cited

U.S. PATENT DOCUMENTS

| | | | |
|---|---|---|---|
| 6,477,150 B1 | 11/2002 | Maggenti et al. | |
| 6,647,020 B1 * | 11/2003 | Maher et al. ................ | 370/432 |
| 6,862,277 B2 * | 3/2005 | Pan et al. .................... | 370/352 |
| 7,340,040 B1 * | 3/2008 | Saylor et al. ............... | 379/67.1 |
| 2002/0141390 A1 | 10/2002 | Fangman et al. | |
| 2002/0145975 A1 * | 10/2002 | MeLampy et al. .......... | 370/235 |
| 2003/0112933 A1 * | 6/2003 | Snelgrove ............... | 379/114.07 |
| 2003/0154249 A1 | 8/2003 | Crockett et al. | |
| 2003/0217174 A1 * | 11/2003 | Dorenbosch et al. ........ | 709/237 |
| 2004/0120283 A1 * | 6/2004 | Rezaiifar et al. ............ | 370/328 |
| 2004/0120474 A1 * | 6/2004 | Lopponen et al. ........ | 379/88.17 |
| 2004/0151192 A1 * | 8/2004 | Trossen ..................... | 370/401 |
| 2005/0094625 A1 * | 5/2005 | Bouat ........................ | 370/352 |

FOREIGN PATENT DOCUMENTS

WO 00/74410 A1 12/2000

OTHER PUBLICATIONS

Ericsson, Siemens, and Motorola, Nokia, "Push-To-Talk over Cellular (PoC); Signaling Flows; PoC Release 1.0", Signaling Flows v1.1.3, Aug. 2003, pp. 1-113, XP-002275219.

* cited by examiner

*Primary Examiner*—Pankaj Kumar
*Assistant Examiner*—Lonnie Sweet

(57) ABSTRACT

According to an embodiment of the present invention, there is provided a system for establishing a connection between a first and a second communication device. The first communication device supports separate voice and data channels and is arranged for sending a pair of a first and second establishment requests, the first request being sent via the data channel and the second request being sent via the voice channel. The system comprises a proxy for receiving the first request via the data channel, and a gateway for receiving the second request via the voice channel. The gateway is arranged to forward the received request to the proxy and the proxy is arranged to forward the earliest received request of the pair of requests to one of a plurality of call control servers for processing.

24 Claims, 2 Drawing Sheets

COMMUNICATIONS

The present invention relates to the field of telecommunications and, more particularly to improvements in or relating to the establishment of packet-based communications, especially with a mobile communication device.

Many modern mobile communication devices, such as mobile telephones, support multiple communication types and channels. For example, a voice channel is typically used for voice communications, for example using global system for mobiles (GSM) whilst a second channel may be used for packet data, for example using general packet radio service (GPRS). Providing similar functionality to that of GSM is the CDMA (code division multiple access) standard, which provides a voice channel and a packet data channel. Such devices may be used for making and receiving traditional telephone calls, as well as accessing advanced data services such as the Internet. In addition to separate voice and data channels, there may also exist one or more signalling channels that may be used, for example, in the set-up and control of the voice channel. Depending on particular systems, one or more of these channels may be either logically or physically distinct from one another. For example, in GSM the voice and signalling channels are logically distinct channels.

As the world of traditional telecommunications continues to merge with the world of data communications, increased use is being made of data networks, and especially Internet protocol (IP) networks for carrying voice signals. This is commonly referred to as voice over IP (VoIP).

Recent mobile communication devices offer, in addition to traditional telephone calls over a voice channel, the ability to send and receive quasi-instantaneous voice messages to one or more subscribers over a packet data channel using VoIP without having the constraints involved in making and receiving a traditional telephone call. Such functionality is designed to substantially emulate two-way radios or walkie-talkies, but without the usual distance restrictions, and is commonly referred to as Push-to-Talk (PTT).

When a user of a mobile communication device wishes to use the push-to-talk functionality the user activates a PTT button on the mobile communication device and speaks into the microphone as normal. Pushing the PTT button establishes a connection, such as an IP or other known data connection, with one or more subscribers or 'buddies'. Once the connection is established the speech is suitably processed and transmitted to the one or more required subscriber(s) using accepted VoIP protocols. The session Initiation protocol (SIP), as defined by the Internet engineering task force's (IETF) request for comments (RFC) 3261, may be used, for example, as the protocol for handling establishment, teardown and management of VoIP calls in push-to-talk applications. When the VoIP data is received by the mobile communication device the speech is output, generally at a loud volume, via the loudspeaker of the mobile communication device.

Services of this type are now emerging, for example as provided by Nextel Communications Inc. However the Nextel push-to-talk service uses the Motorola proprietary integrated digital enhanced network (iDEN). Given the established install base of existing CDMA packet date and GPRS networks, it is increasingly desirable to offer such services over existing networks. In addition the Open Mobile Alliance (OMA), a working group of the 3GPP (3$^{rd}$ Generation Partnership Project), is currently working to standardize push-to-talk over SIP.

One of the problems, however, particularly with using a CDMA packet data channel is the delay required to establish an IP connection between two mobile communication devices, which can typically be in the order of 5-10 seconds. Whilst the connection time is not particularly problematic for data usage such as browsing the Internet or downloading email, the delay becomes largely unacceptable for use with push-to-talk services.

Techniques have been proposed which aim at reducing the IP channel establishment delay by, in addition to requesting an IP connection using SIP over a CDMA packet data channel, sending a short message system (SMS) message to a call control node to enable the call control node to trigger the establishment of the IP channel with the called mobile. SMS messages are typically conveyed via a signalling channel, as is well understood by those skilled in the art. Due to the nature of SMS, the SMS based request will typically be received before the request via the CDMA packet data channel, and such techniques can typically reduce the connection times by a factor of two.

However, current proposals do not efficiently deal with this dual channel establishment method, which results in scalability and performance problems as well as problems with the coordination of the dual channel establishment requests. Additionally, call authorization mechanisms such as subscriber checking, overflow control and the like are likely to be by-passed when using a voice channel for conveying the connection establishment request.

Accordingly, one aim of the present invention is to mitigate at least some of the above-mentioned problems.

According to a first aspect of the present invention, there is provided a system for establishing a connection between a first and a second communication device. The first communication device supports separate voice and data channels and is arranged for sending a pair of a first and second establishment requests, the first request being sent via the data channel and the second request being sent via a signalling channel associated with the voice channel. The system further comprises a proxy for receiving the first request, and a gateway for receiving the second request The gateway is arranged to forward the received request to the proxy, and the proxy is arranged to forward the earliest received request of the pair of requests to a selected one of a plurality of call control servers.

Advantageously, only one of the pair of sent establishment requests is forwarded to a call control server, thereby avoiding the problem of the requests being treated by different call control servers, and the technical problems this introduces. Furthermore, a connection authorization module may be used for providing authorization to establish the connection irrespective of which establishment request is received first by the proxy.

The connection is preferably an Internet protocol (IP) connection and the data channel is a packet data channel.

Preferably the first request is sent in a first format, for example a SIP message, and the second request is sent in a second format, for example as an SMS message.

Suitably, the gateway converts the received request into the first format prior to forwarding the converted request to the proxy.

The system preferably comprises an authorization module for authorizing the proxy to forward the establishment request to the selected call control server.

Suitably, the selected call control server establishes the IP connection with the second communication device.

The gateway may ignore any establishment requests received a predetermined length of time after the transmission of the received message, the predetermined length of time preferably being less than or equal to 32 seconds.

The packet data channel may be a code division multiple access (CDMA) packet data channel and the voice channel may be a code division multiple access (CDMA) voice channel.

According to a second aspect, there is a provided a push-to-talk service using a system as described above.

According to a third aspect, there is provided a method of establishing a connection between a first and a second communication device. The first communication device supports separate voice and data channels, and the method comprises sending, from the first communication device, a first connection establishment request via the data channel and a second connection establishment request via a signalling channel associated with the voice channel, receiving the first request at a proxy, receiving the second request at a gateway, forwarding the second request from the gateway to the proxy, and forwarding the earliest request of the pair of requests received at the proxy to a selected one of a plurality of call control servers.

Preferably the connection is an Internet protocol (IP) connection.

The first request is preferably sent in a first format, and the second request in a second format.

Preferably the gateway converts the received request into the first format prior to forwarding the converted request to the proxy.

Suitably authorization is obtained prior to forwarding the establishment request to the selected call control server, the call control server establishing the IP connection with the second communication device.

Preferably the gateway ignores any establishment requests received a predetermined length of time after the transmission of the received message.

Preferably the first request is sent over a code division multiple access (CDMA) packet data channel, and the second request is sent over a signalling channel associated with code division multiple access (CDMA) voice channel.

According to fourth aspect, there is provided a push-to-talk service operating as described above.

An embodiment of the invention will now be described, by way of example only, with reference to the accompanying drawings, in which.

Figure 1:
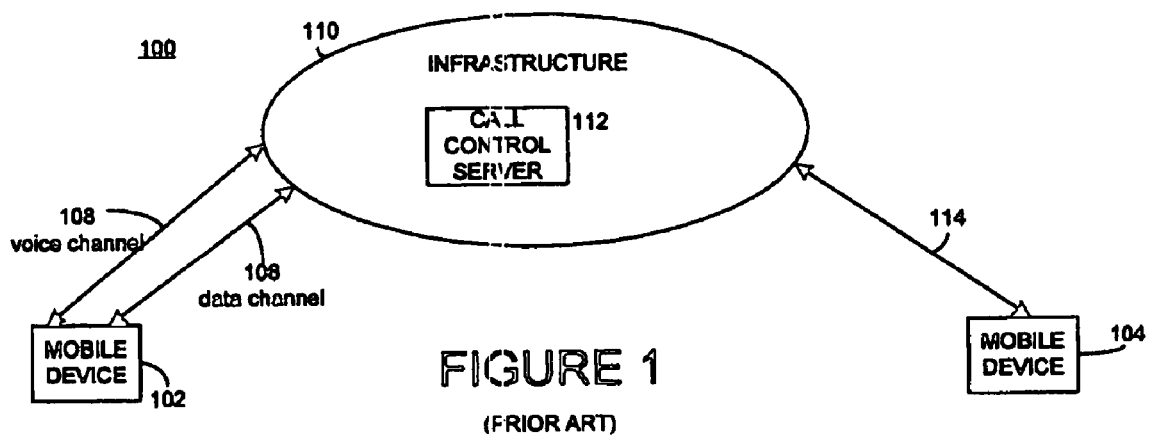
FIG. 1 is a block diagram showing a simple dual-channel connection arrangement according to the prior art.

Referring now to FIG. 1, there is shown a block diagram of a simplified dual-channel connection arrangement 100 according to the prior art.

A multiple channel capable mobile communication device 102, such as a mobile telephone, supports both voice and data communications over channels 106 and 108 respectively. For example, voice calls, such as traditional telephone calls, are handled through a CDMA voice channel interface, and data communications, such as browsing the Internet, sending emails and the like, are handled through a CDMA packet data interface, as is well understood in the art. Associated with the voice channel 108, although not shown, is a signalling channel used for establishment and management of the voice channel 108.

When the user of the mobile communication device 102 wishes to engage in a push-to-talk style communication with the user of another compatible mobile communication device 104 an Internet protocol (IP) connection has to be established between the two remote devices, so that the push-to-talk communication may be conveyed to the mobile communication device 104 using voice over IP (VoIP).

The mobile communication device 102 sends a session initiation protocol (SIP) Invite message via the packet data channel 106. At the same time, or thereabouts, an SMS message is sent containing information similar to that conveyed in SIP invite message, via the signalling channel associated with the voice channel 108.

A SIP call control node 112 within the infrastructure networks 110 processes both of the sent invite messages. Note that for clarity FIG. 1 shows only a single infrastructure network 110.

The SIP call control node acts to establish a SIP call with the mobile communication device 104 based on the first message received from the mobile communication device 102. Under normal circumstances the SMS message will be received prior to the SIP invite message sent over the packet data channel. Based on the information in the SMS message the call control node constructs and sends a SIP invite message to the mobile communication device 104 in order to establish the IP connection between the two mobile communication devices.

Figure 2:
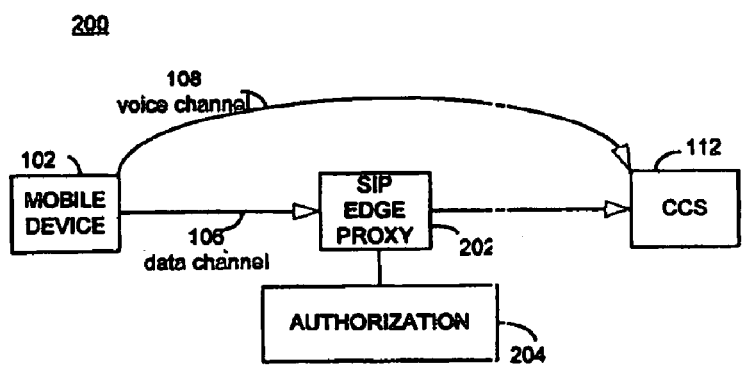
FIG. 2 is a block diagram showing part of the dual-channel connection arrangement of FIG. 1 in greater detail.

FIG. 2 is a block diagram showing part of FIG. 1 in greater detail. The SIP invite message from mobile communication device 102 is sent across the data channel 106 to a SIP edge proxy 202 which performs call authorization, authentication, credit checks, or the like using an authorization module 204. If authorization is obtained the SIP edge proxy 202 forwards the message to the SIP call control server 112. The SMS message is sent across the signalling channel associated with the voice channel 108 directly to the call control server 112. In this way, the call control server 112 is seen as an SMSC, the address of the call control server being preconfigurable in the mobile communication device 102. However, as shown in FIG. 2, the call authorization module 204 is by-passed when using the signalling channel to establish the SIP connection. However, it is preferable that call authorization is performed irrespective of the path taken by the connection establishment request.

Although the systems of FIGS. 1 and 2 are functional, at least in small-scale operations, one of the requirements which arises is that, as the usage of push-to-talk system increases, such systems reed to be scalable to ensure that the expected capacity requirements are fulfilled. For example, to cope with increased demand the single call control server, as shown in FIGS. 1 and 2, may be replaced by one or more additional servers, such as a cluster of servers.

Figure 3:
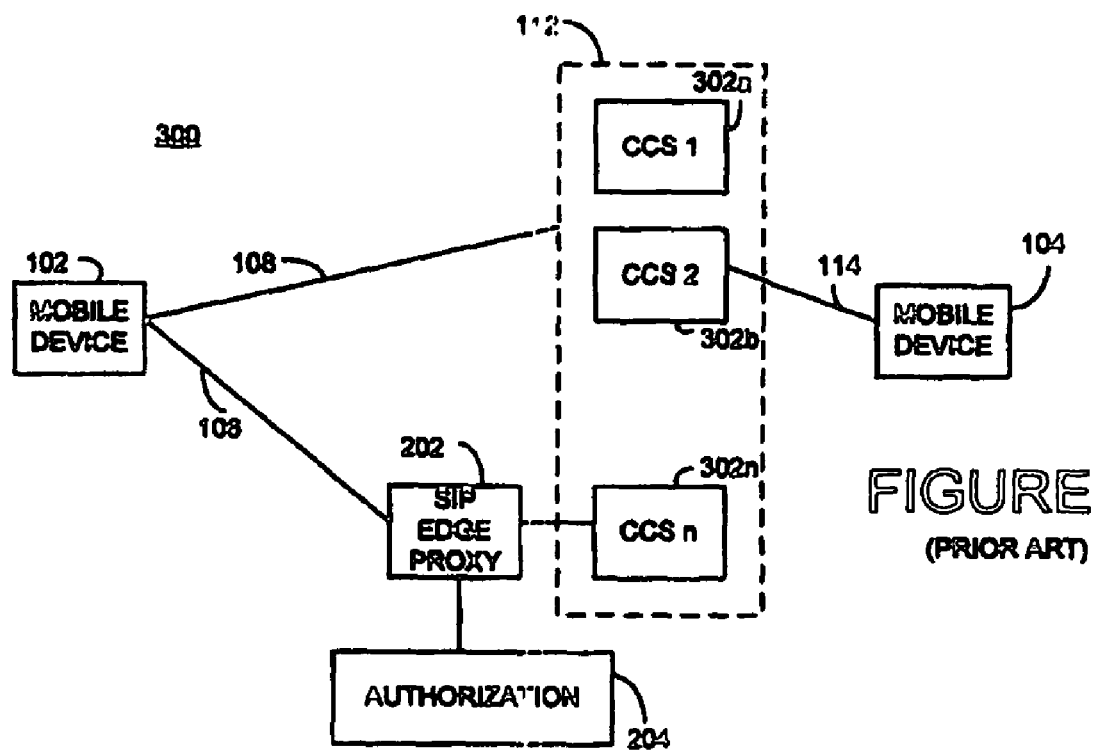
FIG. 3 is a block diagram showing a further dual-channel connection arrangement according to the prior art.

However, one of the problems that arises is that there is no current way of enforcing that both separate connection establishment requests are routed to the same call control server where multiple call servers are available, as shown in FIG. 3. This can cause a situation, for example, where the connection establishment request received via SMS message is dealt with by a different call control server to the connection establishment request sent via the packet data channel. This can lead, for example, to two different connections being established with the mobile communication device 104, which is clearly undesirable. Additionally, and as mentioned previously, since the authorization module 204 is by-passed, this can lead to unauthorized connections being established.

Figure 4:
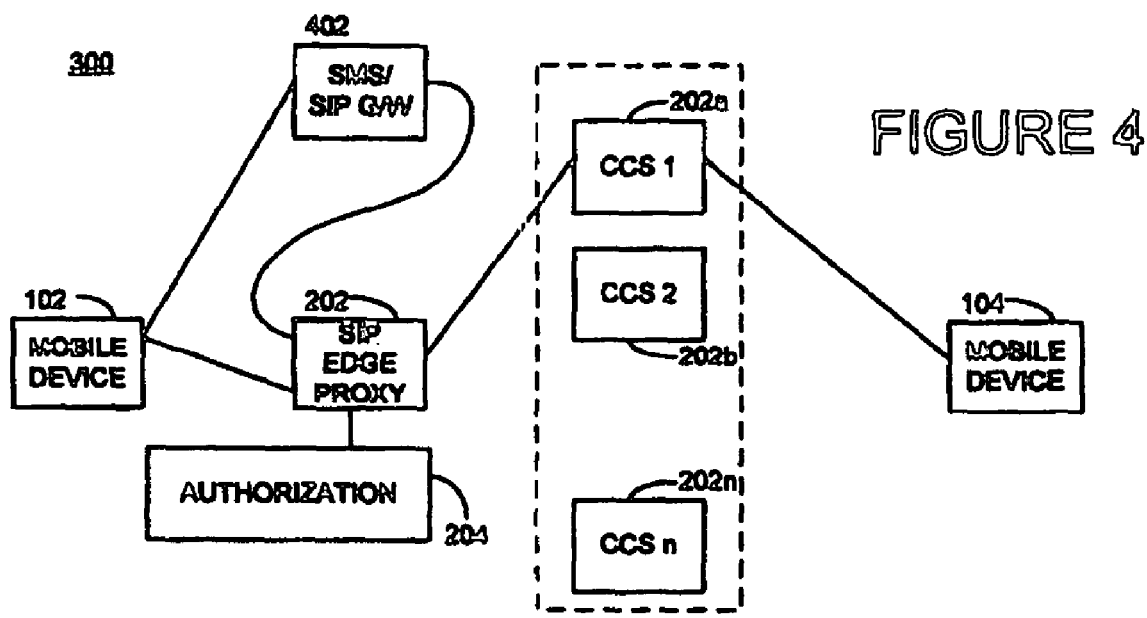
FIG. 4 is a block diagram showing a dual-channel connection arrangement according to an embodiment of the present invention.

One solution would be to have each of the call control servers 302a to 302n share information relating to established connections or incoming establishment requests, but such a system is undesirable as likely to introduce performance, scalability and reliability problems. Furthermore, such a solution would require modifications to be made to standard call control servers to enable such information to be shared, FIG. 4 is a block diagram showing a dual-channel connection establishment system according to an embodiment of the present invention. When a push-to-talk communication is to be made, the mobile communication device 102 sends, in addition to a SIP request over the packet data channel, a connection establishment request over a signalling channel associated with the voice channel, using an SMS message.

The connection establishment request is encapsulated in an SMS message, as described below, and is sent to a SMS/SIP gateway 402, the address or subscriber number of which is preconfigurable in the mobile communication device 102.

Due to the restricted length of SMS messages, typically 160 characters in GSM and 120 characters in CDMA, in some embodiments it may not be possible to send a connection establishment request, such as a full SIP invite message, In the SMS message. Furthermore, certain implementations of CDMA are arranged so that SMS messages over a certain length are sent via the CDMA packet data channel, rather than via the signalling channel. This is to be avoided since the speed advantages of sending the connection establishment request over the voice channel are lost.

In one embodiment, the connection establishment request sent as an SMS message is a full SIP invite message. This may, for example, be possible if the length of the SIP message is less than or equal to the number of available characters of an SMS message in a given system. The SIP invite message may be compressed or uncompressed as required. Alternatively, where supported by the mobile communication device and the network, the SIP invite message may be split over multiple SMS messages in a known manner.

In a further embodiment, where for example the number of characters in an SMS message is more limited, the information conveyed in the SMS message is selected so that the gateway 402 is able to reconstruct a SIP invite message allowing a SIP connection to be established by the edge proxy 202. This may be achieved, for example, in as little as only a few characters, as described below.

In one embodiment, the list of subscribers with which the user wishes to communicate (also known as a buddy list) is held on the service provider network. The buddy list may be maintained, for example, via a web page interface, a wireless application protocol (WAP) application or other suitable means, and contains, for example, a buddy list identifier for each buddy list, and a list of URLs of each subscriber in the buddy list. Thus, the payload of the SMS message need only contain, for example, a one byte buddy list identifier (giving the possibility of 256 different buddy lists), plus a rolling two-byte call identifier. When the gateway 402 receives the SMS message, the appropriate buddy list is retrieved and the destination address(es) of the subscribers In the buddy list obtained from the network. A SIP call identifier is mathematically constructed using, for example, the subscriber number of the user extracted from the SMS header and the two-byte call identifier. The SIP requirement for the call identifier to be globally unique is essentially fulfilled, although eventually repeat call identifiers will occur. However, this is not likely to cause any problems. If this technique is used, preferably the same technique is used by the calling mobile communication device to generate the call identifier of the SIP invite message in the same way, such that the two SIP invite messages contain substantially the same information, as required by the SIP specification defined in RFC 3261. The gateway 402 can thus construct a valid SIP invite message which can be forwarded to the SIP edge proxy to be used in establishing the relevant connection.

The first of the SIP invite messages received by the SIP edge proxy 202, whether received via the signalling channel or the packet data channel, is forwarded to one of the call control servers 202a to 202n in the cluster of call control servers. The decision as to which of the call control servers is chosen may be based, for example, on any known load-balancing algorithm. The chosen call control server processes the SIP invite message and established a SIP connection with the mobile communication device 104, whereby the push-to-talk voice data sent by the mobile communication device 102 is forwarded to and output via the mobile communication device 104. Should the user of the mobile communication device 104 wish to respond to the received voice message, the IP connection with mobile communication device 102 is already established and any voice data sent by the mobile communication device 104 will be transmitted to the mobile communication device 102 using the established return path. The connection may be torn-down after a predefined period of inactivity has been determined.

As mentioned above, the SIP edge proxy will generally receive the SIP invite from the gateway 402 before the SIP invite request via the data channel. When the later of the two invite messages is received, appropriate steps must be taken, preferably by the SIP edge proxy 202 to ensure reception thereof does not lead to a separate SIP connection being established with the mobile communication device 104. If, as is preferable, this is taken care of in the SIP edge proxy, the existing SIP mechanisms dealing with retransmission of invite messages will help ensure that no double connection establishments are attempted. One mechanism by which SIP achieves this is by allocating each SIP invite message a unique call identifier. However, in the present embodiment both of the SIP invite messages sent by the mobile communication device 102 have identical call IDs. Thus, if the SIP edge proxy 202 receives the invite messages at different times, the later received message will be identified by the edge proxy 202 as being an initial SIP invite message, however having an identical call ID to a previously received SIP Invite message. The edge proxy 202 can thus determine that the later received message is effectively a retransmission of the first received invite message, and can be ignored.

If for any reason the connection establishment request sent via the voice channel is substantially delayed, for example since delivery of SMS messages is not guaranteed, it is preferable that the SMS/SIP gateway 402 ignores any received SMS message having a transmission time of more than a predetermined length of time before the reception of the message. Preferably, this length of time is no longer than 32 seconds, since this is the delay, as specified by the SIP specification, after which no retransmission messages may be received. However, given the desired quasi-instantaneous nature of push-to-talk communications, it may be further preferable to shorten this delay even further.

In this way the problem of having the two separate connection establishment requests being processed by different call control servers is avoided.

Although the above-described embodiments refer to communications between two mobile communication devices, embodiments of the invention are in no way limited thereto. For instance, a push-to-talk style communication could be established between a mobile communication device and, for example, a suitably equipped personal computer, or the like, or Indeed between two or more non-mobile communication devices.

The invention claimed is:

1. A system configured to establish a connection between a first and a second communication device, the first communication device configured to support separate voice and data channels, and further configured to send a pair of a first and second establishment requests, the first request being sent via the data channel and the second request being sent via a signaling channel associated with the voice channel, the system comprising:
 a proxy configured to receive the first establishment request;
 a gateway configured to receive the second establishment request, the gateway configured to forward the received second establishment request to the proxy, wherein the proxy is configured to only forward the earliest received establishment request of the pair of requests to a selected one of a plurality of call control servers; and
 an authorization module configured to give authorization to the proxy to forward the earliest received establishment request of the pair of requests to the selected call control server.

2. The system of claim 1, wherein the connection is an Internet protocol (IP) connection.

3. The system of claim 1, wherein the data channel is a packet data channel.

4. The system of claim 1, wherein the first establishment request is sent in a first format, and the second establishment request is sent in a second format.

5. The system of claim 1, wherein the gateway is further configured to convert the received second establishment request into the first format prior to forwarding the converted establishment request to the proxy.

6. The system of claim 1, wherein the selected call control server is configured to establish the IP connection with the second communication device.

7. The system of claim 1, wherein the first establishment request is a session initiation protocol (SIP) message.

8. The system of claim 1, wherein the second establishment request is a session initiation protocol (SIP) message encapsulated in a short message system (SMS) format.

9. The system of claim 1, wherein the gateway is configured to ignore any establishment requests received a predetermined length of time after the transmission of the received message.

10. The system of claim 9, wherein the predetermined length of time is less than or equal to 32 seconds.

11. The system of claim 1, wherein the data channel is a code division multiple access (CDMA) packet data channel.

12. The system of claim 1, wherein the voice channel is a code division multiple access (CDMA) voice channel.

13. A push-to-talk service using a system in accordance with claim 1.

14. A method of establishing a connection between a first and a second communication device, the first communication device supporting separate voice and data channels, the method comprising:
 sending, from the first communication device, a first connection establishment request via the data channel and a second connection establishment request via a signaling channel associated with the voice channel;
 receiving the first connection establishment request at a proxy;
 receiving the second connection establishment request at a gateway;
 forwarding the second connection establishment request from the gateway to the proxy;
 obtaining, at the proxy, authorization to forward the earliest received connection establishment request of the pair of requests to a call control server; and
 forwarding only the earliest connection establishment request of the pair of requests received at the proxy to a selected one of a plurality of call control servers.

15. The method of claim 14, wherein the connection is an Internet protocol (IP) connection.

16. The method of claim 14, wherein the sending the first connection establishment request and the second connection establishment request comprises sending the first connection establishment request in a first format, and sending the second connection establishment request in a second format.

17. The method of claim 14, further comprising converting, at the gateway, the received second connection establishment request into the first format prior to forwarding the converted connection establishment request to the proxy.

18. The method of claim 14, further comprising establishing, through the selected call control server, the IP connection with the second communication device.

19. The method of claim 14, wherein the first connection establishment request is a session initiation protocol (SIP) message.

20. The method of claim 14, wherein the second connection establishment request is a session initiation protocol (SIP) message encapsulated in a short message system (SMS) format.

21. The method of claim 14, further comprising ignoring, at the gateway, any connection establishment requests received a predetermined length of time after the transmission of the received message.

22. The method of claim 14, wherein the data channel is a code division multiple access (CDMA) packet data channel.

23. The method of claim 14, wherein the voice channel is a code division multiple access (CDMA) voice channel.

24. A push-to-talk service operating in accordance with claim 14.

* * * * *